United States Patent
Yamada

(10) Patent No.: US 7,057,319 B2
(45) Date of Patent: Jun. 6, 2006

(54) MAGNETIC BEARING DEVICE STABLY CARRYING A ROTARY SHAFT, PROGRAM FOR EXECUTING A COMPUTER TO CONTROL THE MAGNETIC BEARING STABLY CARRYING THE ROTARY SHAFT AND COMPUTER-READABLE RECORD MEDIUM STORING THE PROGRAM

(75) Inventor: Koji Yamada, Iwata (JP)

(73) Assignee: NTN Corporation, Osaka (JP)

(*) Notice: Subject to any disclaimer, the term of this patent is extended or adjusted under 35 U.S.C. 154(b) by 54 days.

(21) Appl. No.: 10/671,574

(22) Filed: Sep. 29, 2003

(65) Prior Publication Data
US 2004/0070358 A1    Apr. 15, 2004

(30) Foreign Application Priority Data
Oct. 9, 2002    (JP)    ............................. 2002-296466

(51) Int. Cl.
*H02K 7/09*    (2006.01)
(52) U.S. Cl. .................................... 310/90.5
(58) Field of Classification Search ................ 310/90.5
See application file for complete search history.

(56) References Cited

U.S. PATENT DOCUMENTS

| | | | | |
|---|---|---|---|---|
| 4,841,184 A | * | 6/1989 | Chen et al. | ................. 310/90.5 |
| 5,347,190 A | * | 9/1994 | Lewis et al. | ................. 310/90.5 |
| 5,719,455 A | * | 2/1998 | Higasa et al. | ............... 310/90.5 |
| 6,111,333 A | * | 8/2000 | Takahashi et al. | .......... 310/90.5 |
| 6,464,472 B1 | * | 10/2002 | Sekiguchi et al. | ........... 417/351 |
| 6,508,614 B1 | * | 1/2003 | Ozaki et al. | ................. 409/231 |
| 6,770,993 B1 | * | 8/2004 | Heshmat et al. | ............ 310/90.5 |
| 6,787,955 B1 | * | 9/2004 | Ueyama | ..................... 310/90.5 |
| 6,809,448 B1 | * | 10/2004 | Suzuki et al. | ............... 310/90.5 |

FOREIGN PATENT DOCUMENTS

| | | |
|---|---|---|
| JP | 60-16149 | 1/1965 |
| JP | 1-137302 | 5/1989 |
| JP | 7-24602 | 1/1995 |
| JP | 11-93953 | 4/1999 |
| JP | 11-210750 | 8/1999 |
| JP | P2000-145774 A | 5/2000 |
| JP | P2002-89489 A | 3/2002 |

* cited by examiner

*Primary Examiner*—Dang Le
(74) *Attorney, Agent, or Firm*—McDermott Will & Emery LLP

(57) ABSTRACT

A control device estimate a magnitude of a load applied to a magnetic bearing by processing a current instruction (Iref) issued by itself with a low-pass filter. The control device changes a control model in feedback control of the magnetic bearing in accordance with the estimated magnitude of the load, and calculates a control parameter such as a gain in the changed control model. Further, control device sets the calculated control parameter in a feedback controller performing actual feedback control.

13 Claims, 13 Drawing Sheets

F I G. 1 1
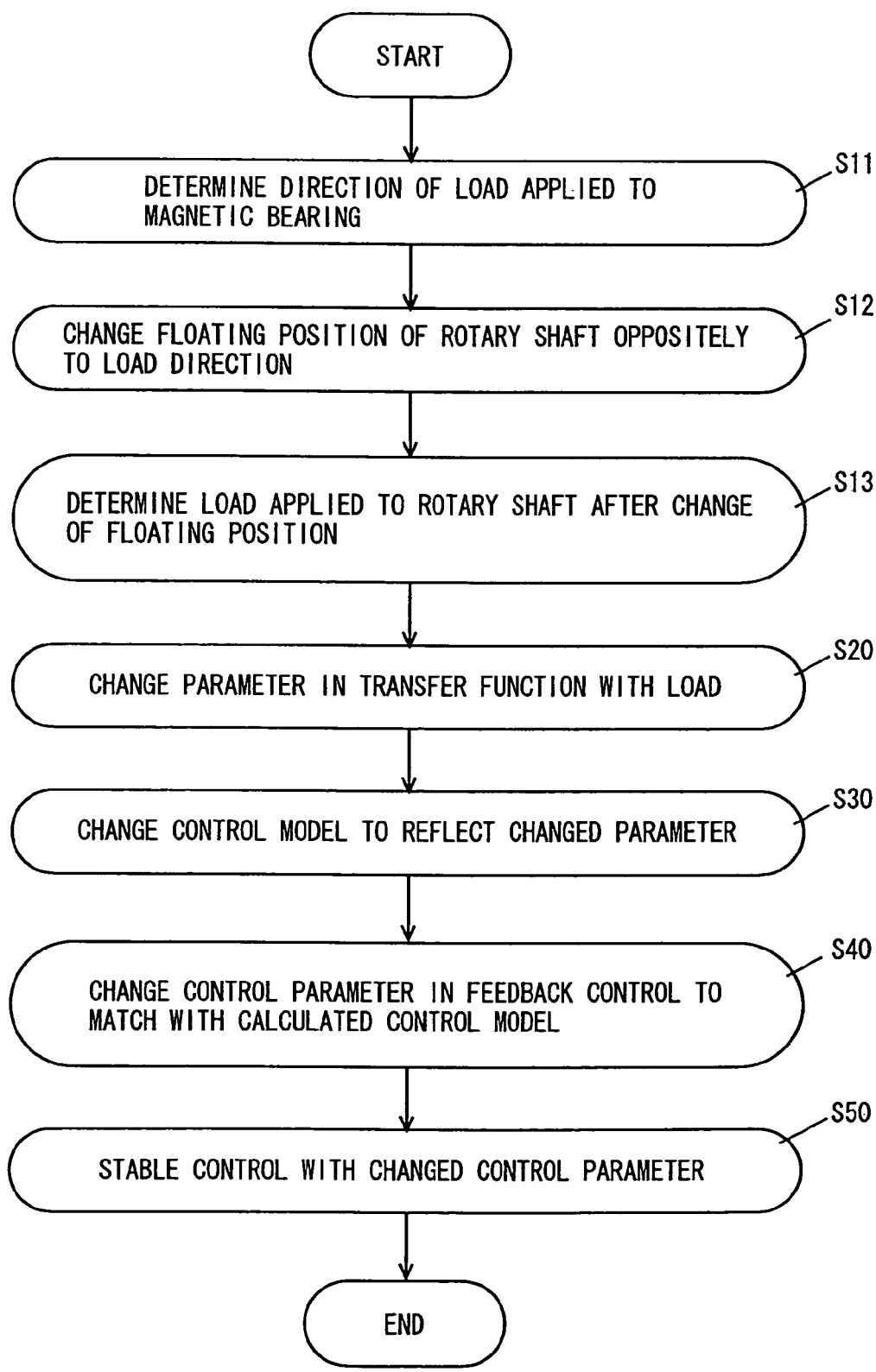

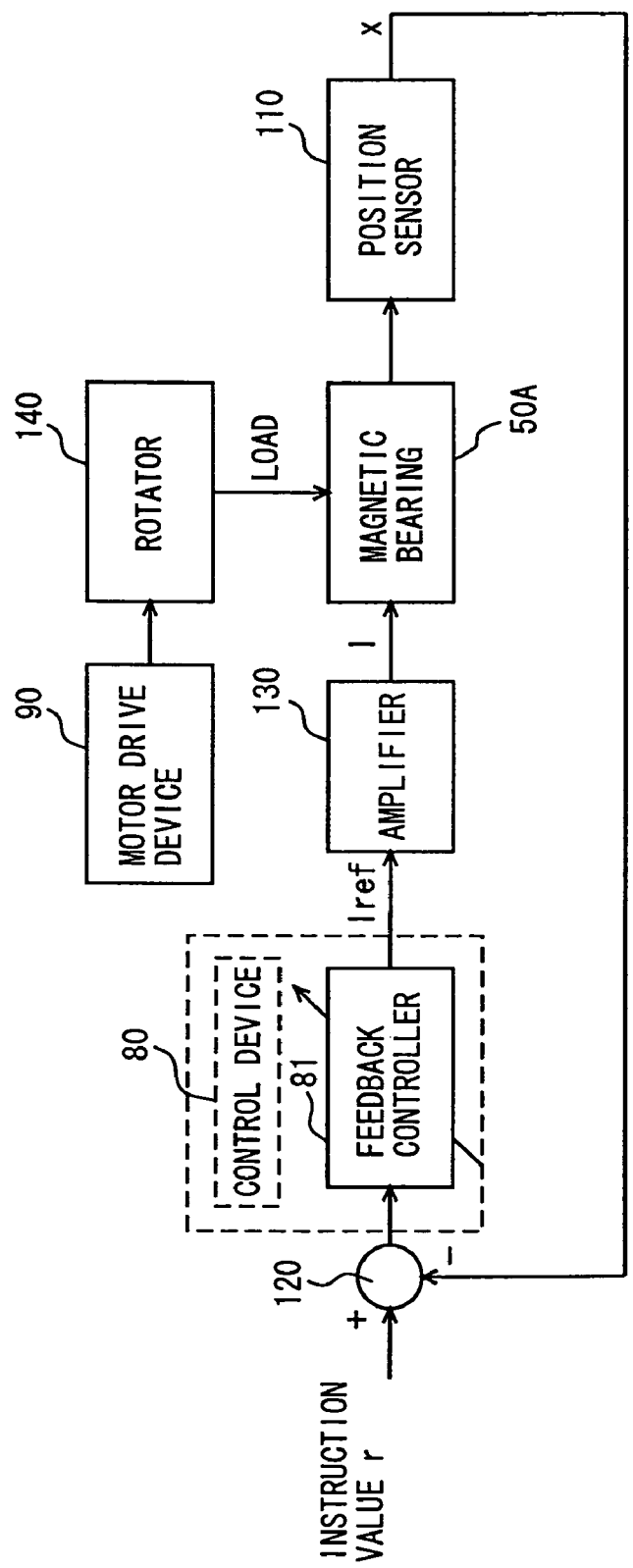
F I G. 12

MAGNETIC BEARING DEVICE STABLY CARRYING A ROTARY SHAFT, PROGRAM FOR EXECUTING A COMPUTER TO CONTROL THE MAGNETIC BEARING STABLY CARRYING THE ROTARY SHAFT AND COMPUTER-READABLE RECORD MEDIUM STORING THE PROGRAM

BACKGROUND OF THE INVENTION

1. Field of the Invention

The present invention relates to a magnetic bearing device stably carrying a rotary shaft, and particularly relates to a magnetic bearing device, which can stably and rotatably carry a rotary shaft even when variations occur in load applied to a rotary shaft, a crossflow fan device for excimer laser provided with the magnetic bearing device, a program for executing a computer to execute feedback control on a magnetic bearing, and a computer-readable record medium storing the program for executing the computer to execute feedback control on the magnetic bearing.

2. Description of the Background Art

A magnetic bearing is used for a spindle, which is employed in a spindle motor for a machine tool or a turbo-molecular pump for rotation at a high speed of tens of thousands of revolutions per minute. In such a high-speed region, a problem of unstable rotation may occur due to a resonance mode or a gyro effect of the rotary shaft. For suppressing such problems, gains and control parameters of a control device controlling the magnetic bearing have been adjusted.

In connection with a spindle for a machine tool, compensation has been made for changes in specific frequency, which may occur due to change of an end tool.

Further, such a technique has proposed that uses a coil current in a magnetic bearing for detecting a load applied to a rotary shaft, and such a technique has also been proposed that a load applied to a rotary shaft, a positional deviation signal of the rotary shaft and a rotation speed thereof are determined, and a gain of a control device controlling the magnetic bearing is controlled based on the load, positional deviation signal and rotation speed thus determined (Japanese Patent Laying-Open Nos. H1-137302, H7-24602, S60-16149 and H11-93953).

However, a conventional magnetic bearing bears a motor torque of several Newton-meters at the most, and the load exerts only a slight influence on stable control of the magnetic bearing. Therefore, such a technique has not substantially been proposed that can stably control the magnetic bearing in view of the influence exerted on the magnetic bearing by the load.

As a technique related to compensation for large load variations of excimer laser, Japanese Patent Laying-Open No. 2002-089489 has disclosed a technique; in which the number of magnetic bearings receiving a load is increased (i.e., magnetic bearings, which are redundant with respect to a degree of freedom of a rotary shaft, are arranged), and control parameters of the magnetic bearings are changed in accordance with a rotation speed of a fan attached to the rotary shaft. Further, in connection with a digital control system of a magnetic bearing using a DSP (Digital Signal Processor), there has been proposed a technique, in which a memory has prestored control parameters corresponding to a rotation speed, and are changed in accordance with the rotation speed. Further, there has been proposed a technique, in which a sensor determines a motor drive current, and a rigidity of a magnetic bearing is changed in accordance with the motor drive current thus sensed. In this technique, a reference value of the motor current is predetermined, and a gain in control of the magnetic bearing is increased when the motor current exceeds the reference value.

However, the fan attached to the rotary shaft exerts a large load, and a motor driving the rotary shaft produce a large torque of ten-odd Newton-meters or more so that a large load is applied to the magnetic bearing. Further, the magnetic bearing undergoes large load variations between a state of receiving substantially no load, e.g., in a vacuum condition and a state of receiving the maximum load. This results in a problem that the magnetic bearing cannot be stably controlled in all the states.

Even if the stable control can be achieved, minute adjustment or regulation is required, and/or a cycle time must be reduced for avoiding rapid acceleration and deceleration so that other performances are sacrificed for these and other reasons.

SUMMARY OF THE INVENTION

Accordingly, an object of the invention is to provide a magnetic bearing device carrying a rotary shaft such that a fan can stably rotate even when large load variations occur.

Another object of the invention is to provide a crossflow fan device for excimer laser, which is provided with a magnetic bearing device carrying a rotary shaft such that a fan can stably rotate even when large load variations occur.

Still another object of the invention is to provide a program for executing a computer to control a magnetic bearing carrying a rotary shaft such that a fan can stably rotate even when large load variations occur.

Yet another object of the invention is to provide a computer-readable record medium storing a program for executing a computer to control a magnetic bearing carrying a rotary shaft such that a fan can stably rotate even when large load variations occur.

According to the invention, a magnetic bearing device includes a rotary shaft, a motor, a magnetic bearing and a control circuit. The rotary shaft carries a fan rotating at a variable speed in a chamber holding a variable gas pressure. The motor rotates the rotary shaft. The magnetic bearing holds the rotary shaft. The control circuit changes a parameter in feedback control performed for holding the rotary shaft in a position allowing stable rotation of the fan in accordance with a load applied to the magnetic bearing.

Preferably, the magnetic bearing includes an electromagnet for holding the rotary shaft in a predetermined position. The control circuit detects the load based on a coil current flowing through a coil forming the electromagnet or a coil current instruction, and changes the parameter in accordance with the determined load.

Preferably, the control circuit determines an average of the coil current or the coil current instruction by processing the coil current or the coil current instruction with a low-pass filter, and determines the load based on the determined average. A time constant of the low-pass filter is larger than a rotation cycle of the rotary shaft.

Preferably, the magnetic bearing device further includes an observer. The observer is capable of estimation of at least a speed and a stepwise load. The control circuit includes a state feedback gain. The observer estimates a state variable by changing a reference model held by the observer itself in accordance with variations in the load. The state feedback gain changes the gain based on the state variable estimated by the observer.

Preferably, the control circuit determines the load based on an output of a motor drive device driving the motor, and changes the parameter in accordance with on the determined load.

Preferably, the control circuit determines magnitudes of frequency components near a crossover frequency on an open-loop transfer function in the feedback control, increases a gain included in the parameter by a predetermined magnitude in response to increase in magnitude of the frequency component on a low frequency side of the determined frequency components, and decreases the gain by a predetermined magnitude in response to increase in magnitude of the frequency component on a high frequency side of the determined frequency components.

Preferably, the control circuit determines the magnitude of the frequency component by performing convolution calculation on only the target frequency component based on the Fourier transform theory.

Preferably, the control circuit performs the convolution calculation on the frequency component for each control cycle. A data length of data subjected to the Fourier transform satisfies a relationship that the data length is equal to a result of multiplication of a cycle at a target frequency by (integer/(control cycle)).

Preferably, the control circuit further controls the magnetic bearing to reduce a change of a control model due to the load applied to the rotary shaft, and changes the parameter based on the control model reduced in change.

Preferably, the magnetic bearing includes a plurality of magnetic bearing pairs. The control circuit determines a direction of the load applied to the rotary shaft based on a plurality of currents flowing through the plurality of magnetic bearing pairs or a plurality of current instructions, and changes a floating position of the rotary shaft in a direction opposite to the determined direction of the load.

Preferably, the control circuit determines a plurality of forces corresponding to the plurality of magnetic bearing pairs and applied to the respective magnetic bearing pairs, and determines a direction of the load by combining the plurality of determined forces.

Preferably, the magnetic bearing includes a plurality of magnetic bearing pairs. The plurality of magnetic bearing pairs are positioned to receive equally a resultant of a load caused by a gravitation of the rotary shaft and a maximum load applied by the fan.

Also, the invention provides a program for executing a computer to perform feedback control on a magnetic bearing such that a rotary shaft carrying a fan rotating at a variable speed in a chamber holding a variable gas pressure is held in a position allowing stable rotation of the fan. The program operates the computer to execute a first step of determining a load applied to the magnetic bearing, a second step of changing a parameter in the feedback control in accordance with the determined load, and a third step of performing the feedback control with the changed parameter.

Preferably, the magnetic bearing includes an electromagnet for holding the rotary shaft in a predetermined position. The first step of the program is executed to determine the load based on a coil current flowing through a coil forming the electromagnet or a coil current instruction.

Preferably, the first step of the program is executed to determine an average of the coil current by processing the coil current with a low-pass filter, and to determine the load based on the determined average. A time constant of the low-pass filter is larger than a rotation cycle of the rotary shaft.

Preferably, the second step of the program includes a first sub-step of estimating a state variable by an observer capable of estimation of at least a speed and a stepwise load while changing a reference model of the observer in accordance with variations in the load, and a second sub-step of changing a gain included in the parameter based on the state variable estimated by the observer by a state feedback gain.

Preferably, the first step of the program is executed to determine the load based on an output of a motor drive device driving a motor driving the rotary shaft.

Preferably, the first step of the program is executed to determine magnitudes of frequency components near a crossover frequency on an open-loop transfer function in the feedback control. The second step is executed to increase a gain included in the parameter by a predetermined magnitude in response to increase in magnitude of the frequency component on a low frequency side of the determined frequency components, and to decrease the gain by a predetermined magnitude in response to increase in magnitude of the frequency component on a high frequency side of the determined frequency components.

Preferably, the first step is executed to determine the magnitude of the frequency component by performing convolution calculation on only the target frequency component based on the Fourier transform theory.

Preferably, the first step of the program is executed to perform the convolution calculation on the frequency component for each control cycle based on data having a data length satisfying a relationship that the data length is equal to a result of multiplication of a cycle at a target frequency by (integer/(control cycle)).

Preferably, the program operates the computer to execute a fourth step of controlling the magnetic bearing to reduce a change of a control model due to the determined load, and the second step is executed to change a gain included in the parameter based on the control model reduced in the change.

Preferably, the magnetic bearing includes a plurality of magnetic bearing pairs. The fourth step of the program includes a first sub-step of determining a direction of the load applied to the rotary shaft based on a plurality of currents flowing through the plurality of magnetic bearing pairs or a plurality of current instructions, and a second sub-step of changing a floating position of the rotary shaft in a direction opposite to the determined direction of the load.

Preferably, the first sub-step of the program includes a step of determining a plurality of forces corresponding to the plurality of magnetic bearing pairs and applied to the respective magnetic bearing pairs, and a step of determining a direction of the load by combining the plurality of determined forces.

Further, the invention provides a computer-readable record medium storing a program.

Further, the invention provides a crossflow fan device for excimer laser including the magnetic bearing device in any one of claims 1 to 12.

According to the invention, the magnitude of the load applied to the magnetic bearing is determined, and the control model is changed in accordance with the determined magnitude of the load. The control parameters such as a gain of the controller in the changed control model are calculated, and the feedback control is performed on the actual magnetic bearing based on the control parameter thus calculated.

In this invention, the magnetic bearing is controlled to reduce the change of the control model due to the load applied to the magnetic bearing.

According to the invention, therefore, the magnetic bearing can be stably controlled even when variations occur in the load applied to the magnetic bearing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart illustrating an operation of adjusting control parameters in the second embodiment.

FIG. 12 is a block diagram of a magnetic bearing device according to a third embodiment.

DESCRIPTION OF THE PREFERRED EMBODIMENTS

Embodiments of the invention will now be described with reference to the drawings. In the figures, the same or corresponding portions bear the same reference numbers, and description thereof is not repeated.

[First Embodiment]

Figure 1:
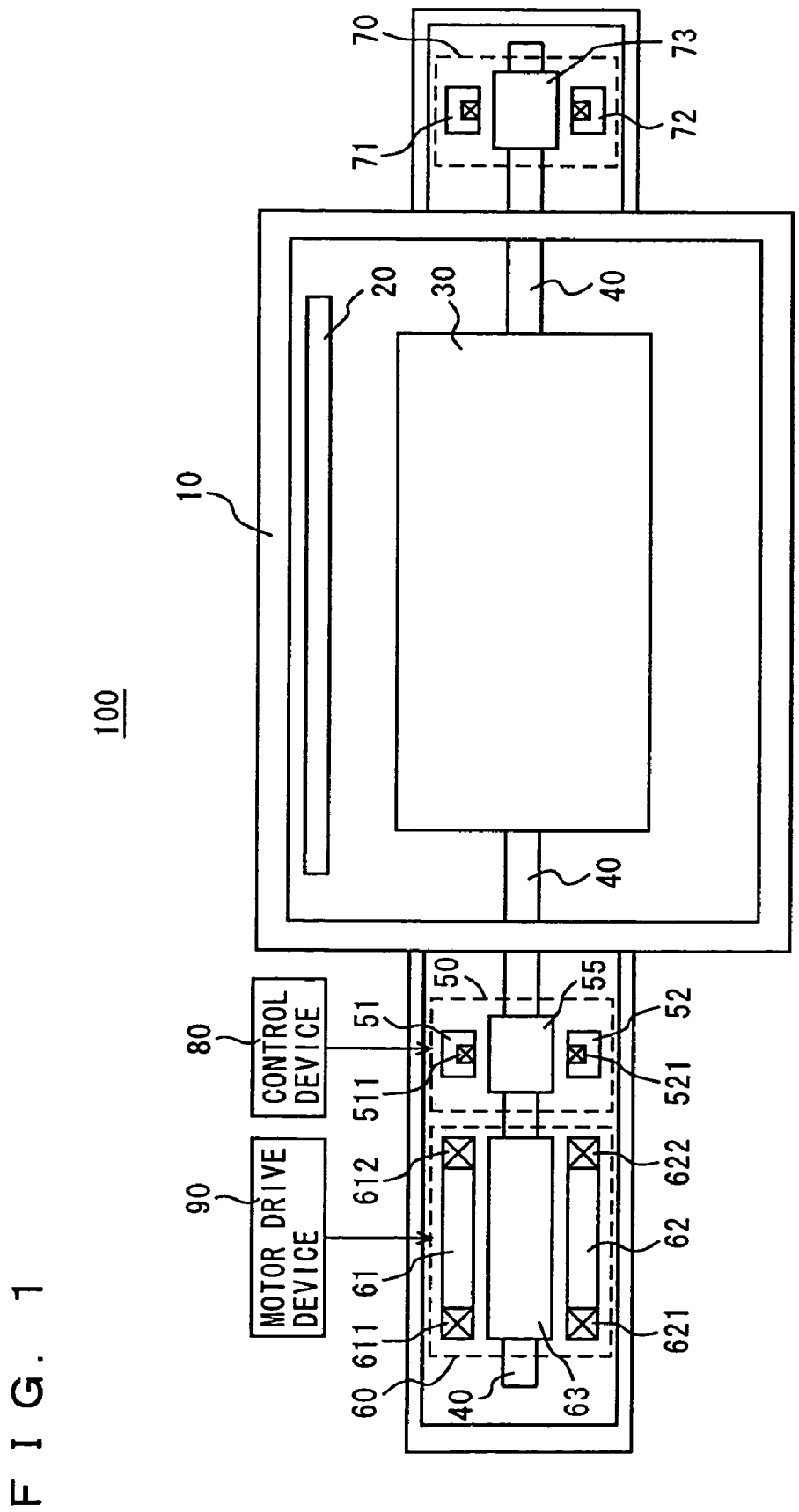
FIG. 1 is a cross section of a crossflow fan for excimer laser provided with a magnetic bearing device according to a first embodiment.

FIG. 1 shows a sectional structure of a crossflow fan for excimer laser provided with a magnetic bearing device according to a first embodiment of the invention. Referring to FIG. 1, a crossflow fan 100 for excimer laser includes a chamber 10, a radiator 20, a fan 30, a rotary shaft 40, magnetic bearings 50 and 70, a motor 60, a control device 80 and a motor drive device 90.

Chamber 10 is supplied with a circulation gas for excimer laser. A pressure in chamber 10 is changed in accordance with an output of the laser. Radiator 20 is arranged near fan 30 within chamber 10 for cooling the circulation gas introduced into chamber 10.

Fan 30 is fixed to rotary shaft 40, and is arranged within chamber 10. Fan 30 is rotated by rotary shaft 40 for circulating the circulation gas in chamber 10.

Magnetic bearings 50 and 70, which are arranged on the opposite sides of chamber 10, respectively, floats and holds rotary shaft 40 at a predetermined position, where fan 30 can rotate with high stability. Rotary shaft 40 has an end fixed to a rotor 63 of motor 60, and is rotated by rotation of rotor 63.

Magnetic bearing 50 includes electromagnets 51 and 52 as well as a target 55. Electromagnets 51 and 52 include coils 511 and 521, respectively. A coil current flowing through coils 511 and 521 produces magnetic forces directed toward target 55 to float rotary shaft 40. Electromagnets 51 and 52 form one electromagnet pair. Although not shown in FIG. 1, magnetic bearing 50 includes another electromagnet pair.

Motor 60 includes stators 61 and 62 as well as rotor 63. Stators 61 and 62 are arranged around rotor 63. Each of stators 61 and 62 includes coils 611 and 612 or coils 621 and 622. Coil currents flowing through coils 611 and 612 as well as coils 621 and 622 produces a magnetic force to rotate rotor 63. Rotor 63 holds rotary shaft 40, and is rotated by the magnetic forces applied from stators 61 and 62. Motor 60 can produce a torque of ten-odd Newton-meters or more.

Magnetic bearing 70 includes electromagnets 71 and 72 as well as a target 73. Electromagnets 71 and 72 have the same structures as electromagnets 51 and 52. Coil currents flowing through the coils produce a magnetic force directed toward target 73 to float rotary shaft 40.

For stable control of magnetic bearing 70, a position sensor (not shown) senses a floating position of rotary shaft 40, and a control device (not shown) controls the coil currents based on the sensed floating position.

A position sensor (not shown) sense a floating position of rotary shaft 40 with respect to electromagnets 51 and 52, and control device 80 performs feedback control of magnetic bearing 50 based on the floating position thus sensed to float rotary shaft 40 in a balanced position, which allows stable rotation of fan 30. In this feedback control, control device 80 determines a load applied to magnetic bearing 50 based on the coil current flowing through coils 511 and 521 of electromagnets 51 and 52, and changes a control gain in the feedback control in accordance with the load thus determined, as will be described later. Control device 80 performs the feedback control of magnetic bearing 50 with the control gain thus changed.

In a position aligned in a thrust direction to the rotary shaft, a magnetic bearing device (not shown) is arranged for keeping the rotary shaft in a predetermined thrust position.

Motor drive device 90 drives motor 60 to produce a predetermined torque.

Figure 2:
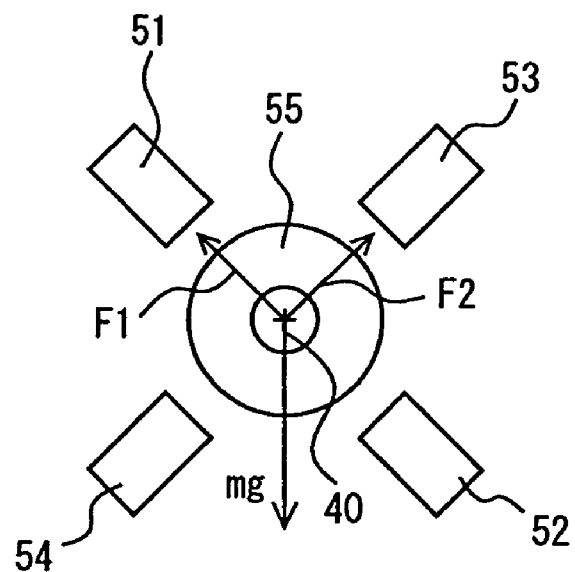
FIG. 2 illustrates an arrangement of a magnetic bearing shown in FIG. 1.
Figure 3:
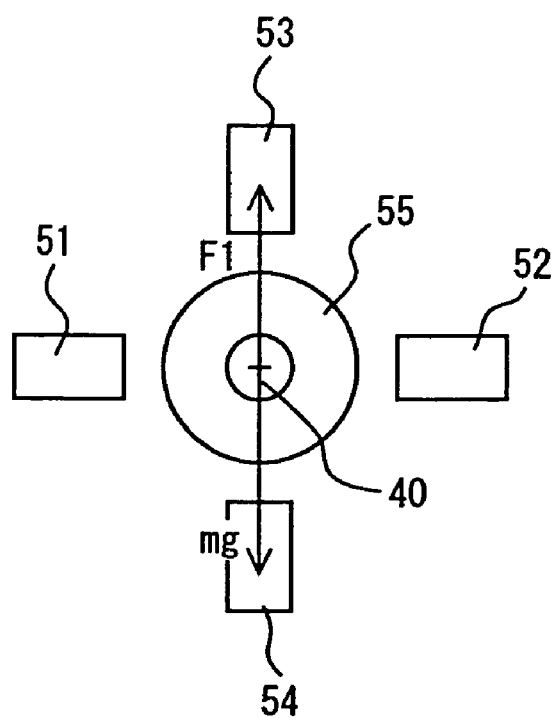
FIG. 3 illustrates another arrangement of the magnetic bearing shown in FIG. 1.

Referring to FIGS. 2 and 3, a manner of arranging magnetic bearing 50 will now be described in greater detail. Referring to FIG. 2, target 55 is fixed to rotary shaft 40. Electromagnets 51–54 are arranged around target 55. Electromagnets 51 and 52 form one electromagnet pair, and electromagnets 53 and 54 form another electromagnet pair. Electromagnets 51 and 52 are arranged at positions symmetric around rotary shaft 40, respectively, and electromagnets 53 and 54 are arranged at positions symmetric around rotary shaft 40, respectively.

The electromagnet pair formed of electromagnets 51 and 52 is arranged to provide orthogonal coordinates together with the other electromagnet pair formed of electromagnets 53 and 54. Thus, electromagnets 51 and 52 are aligned in a direction perpendicular to a direction, in which electromagnets 53 and 54 are aligned.

In FIG. 2, the direction of alignment of electromagnets 51 and 52 as well as the direction of alignment of electromagnets 53 and 54 form angles of 45±22.5 degrees with respect to a direction of a gravitation mg acting on rotary shaft 40, respectively. When fan 30 is stopped, a magnetic force F1 applied by electromagnets 51 and 52 and a magnetic force F2 applied by electromagnets 53 and 54 bear gravitation mg acting on rotary shaft 40.

Referring to FIG. 3, electromagnets 51–54 may be arranged such that the direction of alignment of electromagnets 51 and 52 is perpendicular to the direction of gravitation mg, and the direction of alignment of electromagnets 53 and 54 coincides with the direction of gravitation mg. In FIG. 3, magnetic force F1 produced by electromagnets 53 and 54 bears gravitation mg when fan 30 is stopped.

Figure 4:
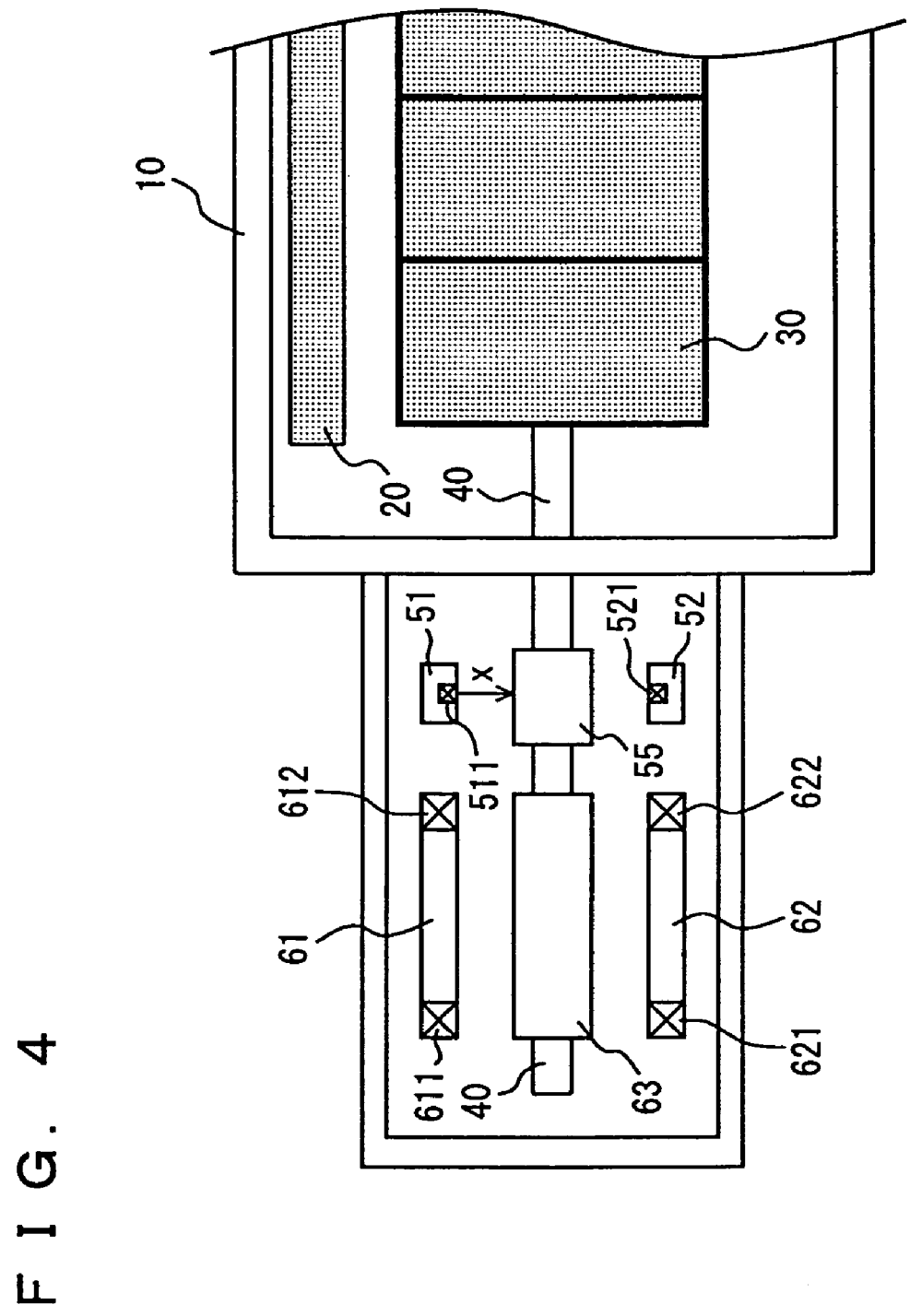
FIG. 4 is a cross section showing a portion of the crossflow fan for excimer laser shown in FIG. 1.

FIG. 4 is a cross section showing a portion of crossflow fan 100 for excimer laser. A predetermined coil current flows through coils 511 and 512 of electromagnets 51 and 52 to bear gravitation mg acting on rotary shaft 40 so that magnetic bearing 50 floats rotary shaft 40 at a predetermined position.

When predetermined coil currents flow through coils 611 and 612 and coils 621 and 622 of stators 61 and 62 to produce a predetermined torque by motor 60, rotor 63 receives the magnetic force from stators 61 and 62, and rotates at a predetermined rotation speed. In accordance with this rotation, rotary shaft 40 rotates at a predetermined speed. In accordance with rotation of rotary shaft 40, fan 30 rotates in chamber 10 to circulate the circulation gas.

In crossflow fan 100 for excimer laser, the pressure of the circulation gas in chamber 10 changes to a large extent in accordance with an operation state of the excimer laser. Therefore, when the pressure of the circulation gas in chamber 10 increases, fan 30 cannot rotate in chamber 10 without a resistance, and applies a load to rotary shaft 40. Also, stators 61 and 62 of motor 60 are made of electromagnets, and therefore applies an attractive force to rotary shaft 40. Further, rotation speed of rotary shaft 40 changes to a large extent.

Therefore, magnetic bearing 50 receives the load, which is variable depending on the drive state of crossflow fan 100 for excimer laser, and a gap in magnetic bearing 50, i.e., a distance x (which may also be referred to as a "position x") between electromagnet 51 and target 55 changes depending on the load applied to magnetic bearing 50.

While fan 30 is rotating, position x is determined for floating rotary shaft 40 at a balanced position X, where fan 30 can stably rotate, and the feedback control is effected on magnetic bearing 50 so that the position x thus determined may match with balanced position X. The control gain in the feedback control is changed in accordance with the load applied to magnetic bearing 50.

Figure 5:
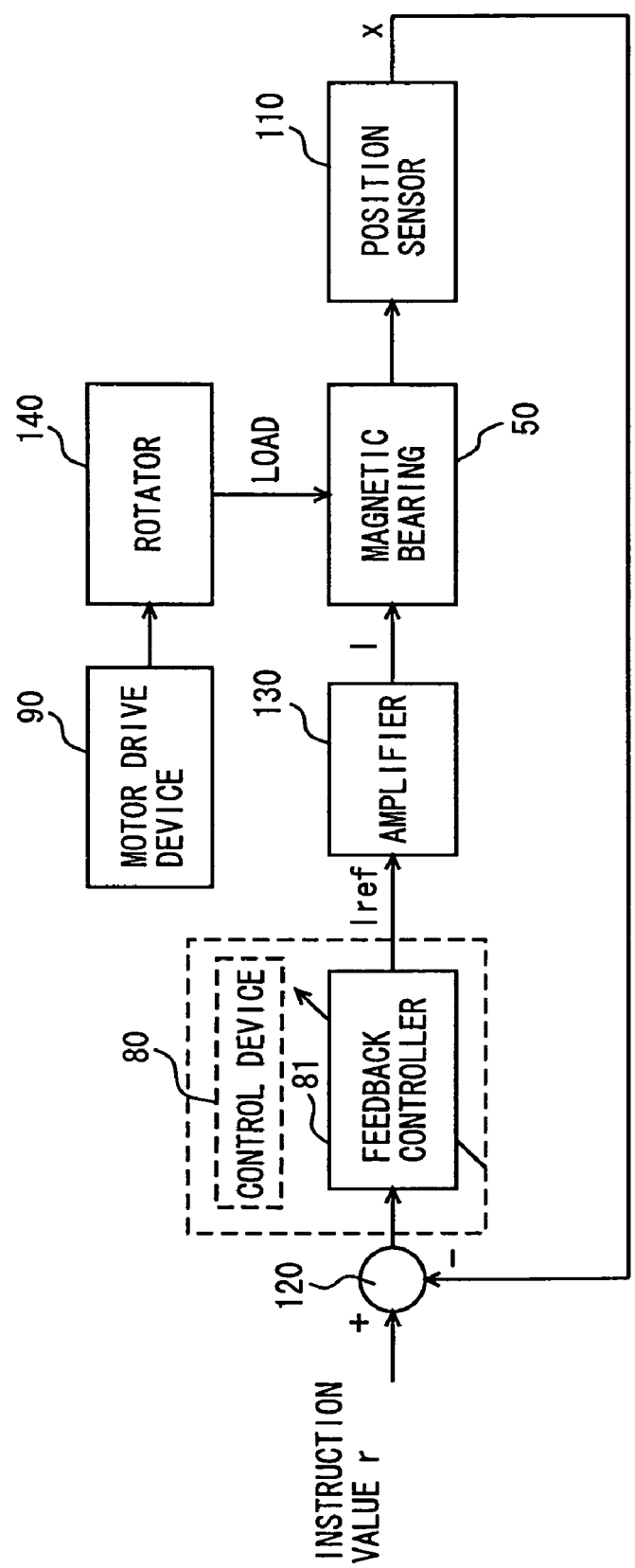
FIG. 5 is a block diagram of a magnetic bearing device according to the first embodiment.

FIG. 5 is a block diagram of the magnetic bearing device according to the invention. Referring to FIG. 5, a position sensor 110 determines a position of magnetic bearing 50, i.e., position x of target 55 with reference to electromagnet 51, and provides position x thus determined to a subtractor 120. Position sensor 110 can employ any manner for determining position x.

Subtractor 120 calculates a deviation between an instruction value r and position x output from position sensor 110, and provides the calculated deviation to control device 80.

Control device 80 includes a feedback controller 81. Based on the deviation received from subtractor 120, control device 80 provides a current instruction Iref, which can stably control magnetic bearing 50, from a feedback controller 81 to an amplifier 130. Amplifier 130 supplies a current I, which matches with current instruction Iref provided from feedback controller 81, through coils 511 and 512 of magnetic bearing 50.

A rotator 140 is formed of fan 30, rotary shaft 40 and motor 60. Motor drive device 90 drives motor 60 forming rotator 140. As current I flows through coils 511 and 521, magnetic bearing 50 floats rotary shaft 40, which is coupled to fan 30 and rotor 63 of motor 60, and holds rotary shaft 40 in balanced position X.

As described above, magnetic bearing 50 receives the load from fan 30, rotary shaft 40 and motor 60. A motion equation of magnetic bearing 50 can be expressed by the following formula (1):

$$m\frac{d^2x}{dt^2} = mg - k\left(\frac{i}{x_0 \times x}\right) + Ff + Fm(x) \tag{1}$$

where m represents a mass of rotary shaft 40, g represents an acceleration of gravity, and k and x0 are constants of magnetic bearing 50. Also, x represents the gap in magnetic bearing 50 already described, and i represents a current flowing through electromagnets 51–54. Ff represents a static disturbance having a magnitude corresponding to the load applied from fan 30, and Fm(x) represents an attractive force of motor 60. Fm(x) is a function of gap x.

As can be seen from the formula (1), magnetic bearing 50 is a nonlinear control target, and linearization processing is required around an equilibrium point for designing a controller performing feedback control of magnetic bearing 50.

When rotary shaft 40 floats at floating position X, a relationship between floating point X and balance current I in this floating state can be expressed by the following formula (2):

$$I = \sqrt{\frac{mg + Ff + Fm(\Delta)}{k}}\, X \tag{2}$$

When the linearization processing is effected on gap x around balance current I in accordance with the formula (2), a transfer function of magnetic bearing 50 calculated in accordance with formula (1) is expressed by the following formula (3):

$$P = \frac{-\frac{2kI}{mX^2}}{s^2 - \left(\frac{2k}{m}\frac{I^2}{X^3} + q\frac{Bg^2}{X}\right)} \tag{3}$$

where s represents a Laplace operator, Δ is a deviation between the center of magnetic bearing 50 and the magnetic center of motor 60, Bg represents a magnetic flux density of motor 60, and q represents a constant of motor 60.

When rotary shaft 40 stops the rotation, a relationship of Ff=Fm=0 is achieved. When rotary shaft 40 rotates, relationships of Ff≠0 and Fm(x)≠0 are present so that the control model of the control target changes to a large extent depending on the loads applied from fan 30 and motor 60.

Accordingly, control device 80 processes current instruction Iref issued by control device 80 itself with a low-pass filter, and thereby calculates an average of current instruction Iref. Based on the calculated average, control device 80 estimates the magnitude of the load applied to magnetic bearing 50.

When rotary shaft 40 rotates, magnetic bearing 50 receives the load from fan 30 and motor 60, and tends to change gap x. Balance current I for floating target 55 of magnetic bearing 50 at balanced position X varies depending on the magnitude of the load applied to magnetic bearing 50. As the load applied to magnetic bearing 50 increases, balance current I flowing through electromagnets 51–54 of magnetic bearing 50 increases.

Accordingly, the magnitude of the load applied to magnetic bearing 50 can be estimated from balance current I flowing through electromagnets 51–54 of magnetic bearing 50. For these reasons, the embodiment is configured to estimate the load applied to magnetic bearing 50 by determining balance current I flowing through electromagnets 51–54.

For determining balance current I flowing through electromagnets 51–54, it is necessary to determine balance current I provided from amplifier 130, and balance current I provided from amplifier 130 steadily matches with current instruction Iref provided from control device 80. Therefore, the embodiment is configured to estimate the magnitude of the load applied to magnetic bearing 50 based on current instruction Iref. Thereby, it is not necessary to employ an A/D converter converting balance current I (i.e., analog signals) to digital signals.

Control device 80 processes current instruction Iref by the low-pass filter, of which time constant is set much larger than the rotation cycle of rotary shaft 40. More specifically, the time constant of the low-pass filter is set ten or more times larger than the rotation cycle of rotary shaft 40, and is in a range from 0.1 to 2.0 seconds.

As described above, the time constant of the low-pass filter is ten or more times larger than the rotation cycle of rotary shaft 40. The reason for this is as follows. Variations in load applied to magnetic bearing 50, i.e., changes in rotation speed of rotary shaft 40 or changes in gas pressure of the circulation gas are on the order from hundreds of milliseconds to several seconds. Therefore, control device 80 does not require an instantaneous value of the current for estimating the magnitude of the load applied to magnetic bearing 50, but merely requires an average of the current. By estimating the magnitude of the load from the average of the current, it is possible to remove an influence exerted by the load due to imbalance in rotation of rotary shaft, which appears cyclically, and it is possible to estimate only the variations in load due to the load applied by fan 30 and the attractive force applied by motor 60.

When control device 80 estimates the magnitude of the load applied to magnetic bearing 50, it changes parameters in the formula (3) in accordance with the estimated magnitude of the load, and restructures the control model of magnetic bearing 50. Control device 80 calculates the gain in the control model thus restructured, and adjusts the control gain in feedback controller 81 to match the control gain with the calculated gain.

In this invention, control device 80 estimates the magnitude of the load applied to magnetic bearing 50, which is the target of the feedback control, and the control model for the feedback control of magnetic bearing 50 is restructured such that target 55 of magnetic bearing 50 floats at balanced position X allowing stable rotation of rotary shaft 40 when the load of the estimated value is applied to magnetic bearing 50. Further, the control parameters in the actual feedback control of magnetic bearing 50 are adjusted to match with the control model thus restructured.

Thereby, even when the load applied to magnetic bearing 50 varies in magnitude, magnetic bearing 50 can be stably controlled by determining the gain and other control parameters to correspond to the magnitude of the load applied to magnetic bearing 50.

Figure 6:
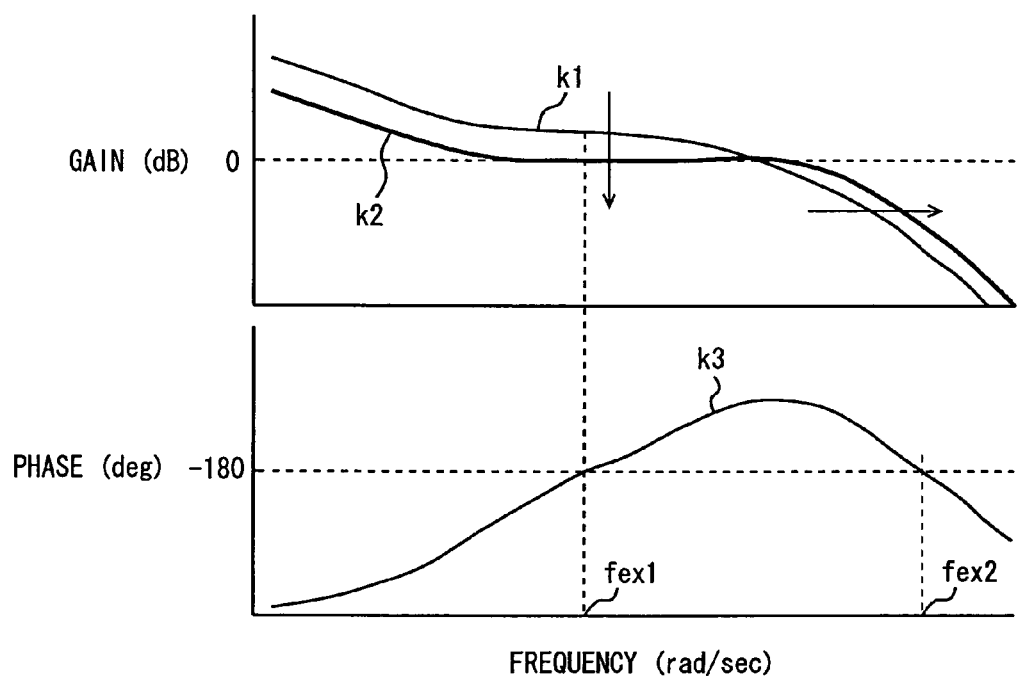
FIG. 6 illustrates frequency-dependency of an open-loop transfer function in a control model of the magnetic bearing shown in FIG. 1.

According to the distinctive feature of the invention, as described above, the magnitude of the load applied to magnetic bearing 50 is estimated, the control model is restructured according to the estimated magnitude of the load, and the control gain in feedback controller 81 is adjusted. Referring to FIG. 6, description will now be given on the reasons, for which control device 80 in the feedback control of magnetic bearing 50 is changed depending on the magnitude of the load.

FIG. 6 illustrates an open-loop transfer function in the control model of magnetic bearing 50. Feedback controller 81 is designed to match with the control model in the state where rotary shaft 40 is stopped, and thus no load is applied to magnetic bearing 50.

In FIG. 6, the ordinate gives the gain and the phase, and the abscissa gives the frequency. A curve k1 represents frequency-dependency of the gain in the case where no load is applied to magnetic bearing 50, a curve k2 represents frequency-dependency of the gain in the case where a load is applied to magnetic bearing 50, and a curve k3 represents frequency-dependency of the phase.

When the load is applied to magnetic bearing 50, the gain near a phase crossover frequency fex1 on a low frequency side lowers significantly. Also, curve k2 has flat characteristics (in which a frequency gradient of the gain is substantially zero) over a wide region, and has only little stability margin throughout the frequency region. According to curve k2, the gain increases in a high frequency region, and it is not necessarily preferable to increase the control gain for improving the stability margin, when consideration is given to the influence by a primary bending mode of the rotary shaft or the influence by noises of the actual system.

For improving the stability margin without increasing the whole control gain, it is possible, according to the general rules of the control theory, to employ selectively two manners of: (A) designing the controller to provide a phase, which is leading over the frequency region much wider than the region of flat characteristics, and (B) designing the controller achieving a large integration gain to increase the control gain in the low frequency region.

However, the control model of magnetic bearing 50 exhibits the flat gain characteristics as described above, and therefore, the manner (A) cannot achieve a sufficient effect because the gain in the low frequency region becomes low as a whole. If the phase is leading extremely widely, the rigidity of magnetic bearing 50 becomes too low to bear the large load applied by fan 30. According to the manner (B), the integration gain must be considerably large for compensating for the flatness of gain characteristics. This narrows the frequency region of the leading phase and reduces the phase margin. In FIG. 6, such problems become remarkable that oscillation is liable to occur in the primary mode of the bending, which is present in the region of the phase smaller than −180 degrees, and that magnetic bearing 50 itself cannot be stabilized without difficulty.

Accordingly, control device 80 including feedback controller 81 is changed for improving the stability margin and achieving the stable control of magnetic bearing 50.

In the description already made, control device 80 estimates the magnitude of the load applied to magnetic bearing 50 by using current instruction Iref issued by control device 80 itself. According to the invention, control device 80 may be configured such that control device 80 receives balance current I provided from amplifier 130, obtains the average current value by processing received balance current I thus received with the low-pass filter, and estimates the magnitude of the load applied to magnetic bearing 50 based on the average current value thus obtained. Since amplifier 130 has a feedback loop of the current, balance current I supplied from amplifier 130 is provided to control device 80.

Further, control device 80 may be configured to monitor the output of motor drive device 90 and to estimate the magnitude of the load applied to magnetic bearing 50 based on the monitored output. As the load applied from fan 30 increases, the torque for driving motor 60 must increased in accordance with such increase in load for rotating rotary shaft 40 at a predetermined speed. Since the large output of motor drive device 90 results in the large load applied to magnetic bearing 50, the magnitude of the load applied to magnetic bearing 50 can be estimated based on the output of motor drive device 90.

Instead of current instruction Iref, balance current I provided from amplifier 130 or the output of motor drive device 90 may be used for estimating the magnitude of the load applied to magnetic bearing 50, in which case, as described above, control device 80 obtains the average of balance current I by using the low-pass filter, or obtains the average of the output of motor drive device 90, and estimates the magnitude of the load applied to magnetic bearing 50 based on the obtained average of balance current I or the obtained average of the output. The time constant in the low-pass filter is determined to fall within the foregoing range.

Further, control device 80 may be configured not to calculate actually the gain in the restructured control model, and may be configured such that control device 80 holds a table relating to current instruction Iref (or balance current I or the output of motor drive device 90) and the gain in the control model, and adjusts the control gain in feedback controller 81 to match with the gain corresponding to the input current instruction Iref (or balance current I or the output of motor drive device 90).

Further, control device 80 may be configured to adjust the control gain in feedback controller 81 in accordance with the frequency-dependency illustrated in FIG. 6. As illustrated in FIG. 6, the crossover frequency is formed of a crossover frequency fex1 on the low frequency side and a crossover frequency fex2 on the high frequency side. Therefore, control device 80 extracts only the frequency components near crossover frequencies fex1 and fex2 by the Fourier transform, and determines the frequency component on the low frequency side and the frequency component on the high frequency side.

When the load applied to magnetic bearing 50 increases, vibrations are observed around crossover frequency fex1. When the load applied to magnetic bearing 50 decreases, vibrations are observed around crossover frequency fex2.

Therefore, when vibrations are observed around crossover frequency fex1, control device 80 increases the control gain in feedback controller 81 by a predetermined magnitude. When vibrations are observed around crossover frequency fex2, control device 80 decreases the control gain in feedback controller 81 by a predetermined magnitude.

Thus, control device 80 estimates the magnitude of the load applied to magnetic bearing 50 based on the frequency-dependency of the phase of the transfer function in the feedback control system of magnetic bearing 50, and adjusts the control gain in feedback controller 81 in accordance with the estimated magnitude of the load.

A manner of changing the control gain will now be described. It is assumed that PL represents a determined magnitude of the frequency component on the low frequency side, PH represents a determined magnitude of the frequency component on the high frequency side, PLmin and PHmin represent lower limits of predetermined optimum values, respectively, and PLmax and PHmax represent higher limits of predetermined optimum values, respectively.

A relationship of trade-off is present between magnitudes PL and PH. When the load applied to magnetic bearing 50 decreases, and the gain of the control system increases, magnitude PH increases, and magnitude PL decreases. When the load applied to magnetic bearing 50 increases, and the gain of the control system decreases, magnitude PL increases, and magnitude PH decreases.

In the case of (PL<PLmin) or (PH>PHmax), it is determined that the control gain is excessively high, and the control gain is lowered by a predetermined constant magnitude. In the case of (PL>PLmax) or (PH<PHmin), it is determined that the control gain of the control system is excessively low, and the control gain is raised by a predetermined constant magnitude.

Control device 80 performs the foregoing determination in every determination cycle of the frequency component. Therefore, if the state, e.g., of (PL>PLmax) continues, the control gain continuously increases. For preventing excessive rising and excessive lowering of the control gain, therefore, the control gain is no longer changed when the control gain reaches a predetermined upper limit or a predetermined lower limit.

As described above, control device 80 changes the control gain within the range between the predetermined upper and lower limits in accordance with the determined vibrations of the frequency components. The predetermined value, by which control device 80 changes the control gain, is substantially equal to half or double the control gain in the state, where fan 30 does not apply the load to magnetic bearing 50, if the same conditions continue for three to five seconds.

For determining the magnitude of the frequency component on the low frequency side and the magnitude of the frequency component on the high frequency side, control device 80 does not perform the Fourier transform operation on all the frequency components in contrast to FFT (Fast Fourier Transform), but performs the Fourier transform operation on only the required frequency components. Thus, control device 80 performs the convolution calculation.

Since variations in load applied to magnetic bearing 50 are sufficiently slower than the control cycle, control device 80 performs one convolution calculation in every control cycle so that the calculation time and the required memory can be reduced.

The control device 80 performs the Fourier transform on the data having a data length, which satisfies the relationship that the data length is equal to a result of multiplication of the cycle at the target frequency by (integer/(control cycle)), and thereby determines the vibrations of the frequency components. In this manner, the timing of updating the control gain varies depending on the target frequency, but the magnitude of the frequency components at different frequencies can be equally evaluated.

For example, when rotary shaft 40 rotates at 10 Hz, the time required for taking the data for one rotation cycle into control device 80 is different from that required when rotary shaft 40 rotates at 50 Hz. Therefore, if the data take-in operation were configured to take a constant time regardless of the rotation frequency, the data on the low frequency side would be smaller than that on the high frequency data. Consequently, the frequency component on the low frequency side would be evaluated based on the data amount smaller than that for the frequency component on the high frequency side. For avoiding the above situation and taking in the data for at least one rotation at each frequency, control device 80 is configured to perform the Fourier transform operation on the data having the data length, which satisfies the relationship that the data length is equal to a result of multiplication of the cycle at the target frequency by (integer/(control cycle)).

Control device 80 may adjust the control gain such that either the frequency component on the low frequency side or the frequency component on the high frequency side is constant.

As described above, control device 80 performs the Fourier transform operation on the lower frequency component and the higher frequency component based on the frequency-dependency illustrated in FIG. 6, thereby determines the vibrations of the frequency component on the low frequency side or the vibrations of the frequency component on the high frequency side, and adjusts the control gain in feedback controller 81 in accordance with the determined vibrations of the frequency component.

In this case, the determination of the vibrations of the frequency component on the low frequency side or the vibrations of the frequency component on the high frequency side by control device 80 corresponds to the estimation of the magnitude of the load applied to magnetic bearing 50.

Therefore, the control, in which the control gain is adjusted in accordance with the vibrations of the frequency component, is the concept included in the processing of estimating the magnitude of the load applied to magnetic bearing 50 and adjusting the control gain in accordance with the estimated magnitude of the load.

Figure 7:
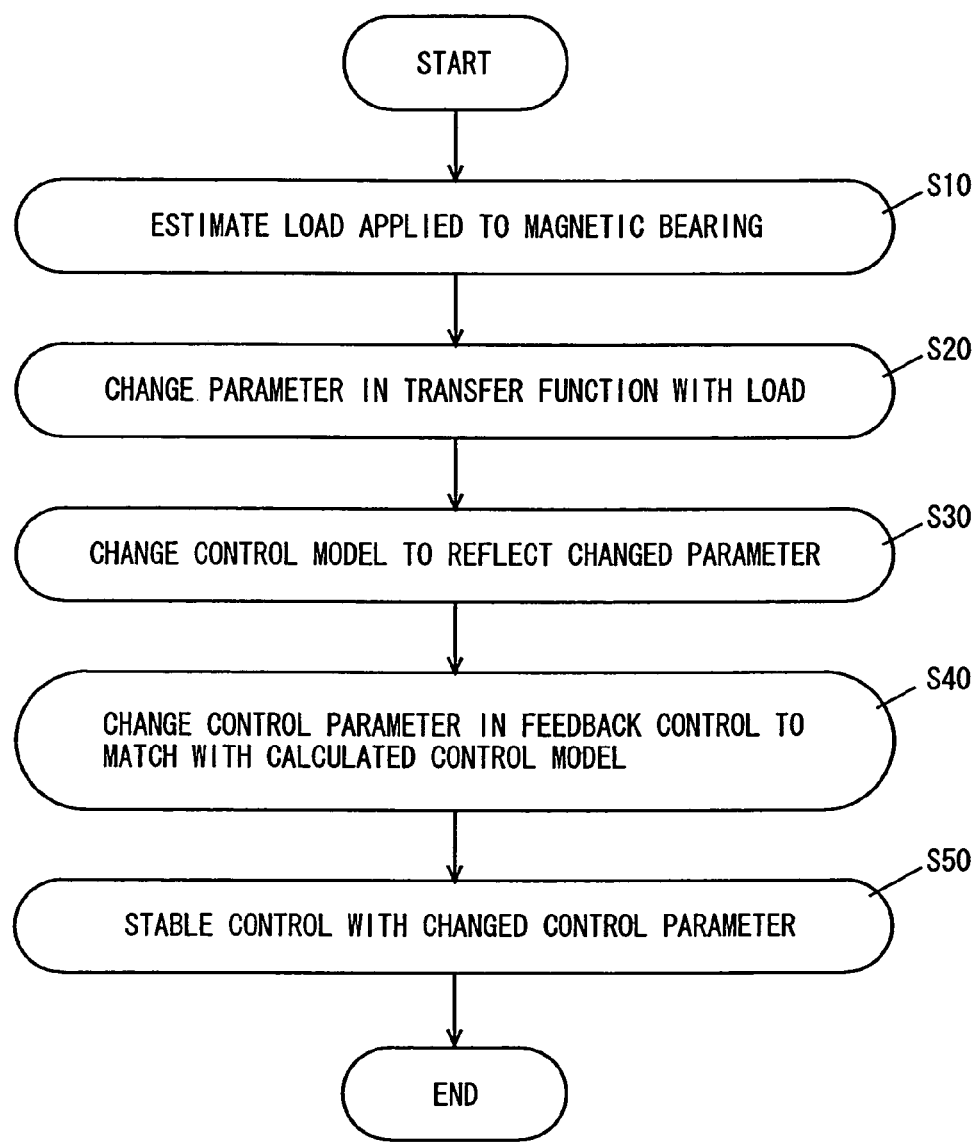
FIG. 7 is a flowchart illustrating an operation of adjusting control parameters in the first embodiment.

Referring to FIG. 7, description will now be given on the operation of adjusting the control gain by control device 80. When the operation of adjusting the control gain starts, control device 80 processes current instruction Iref issued by control device 80 itself with a low-pass filter to calculate the average current value of current instruction Iref, and estimates the magnitude of the load applied to magnetic bearing 50 based on the average current value thus calculated (step S10).

Thereafter, control device 80 changes the parameters (i.e., parameters in formula (3)) in the transfer function of the control model in the feedback control of magnetic bearing 50 in accordance with the estimated magnitude of the load (step S20). Control device 80 changes the control model in the feedback control of magnetic bearing 50 to the control model reflecting the changed parameters (step S30).

Thereby, control device 80 calculates the control parameters such as a gain in the changed control model (step S40), and sets the calculated control parameters such as a gain in feedback controller 81. Control device 80 performs the feedback control of magnetic bearing 50 with the control parameters thus adjusted (step S50). Thereby, the operation of adjusting the control parameters ends.

Figure 8:
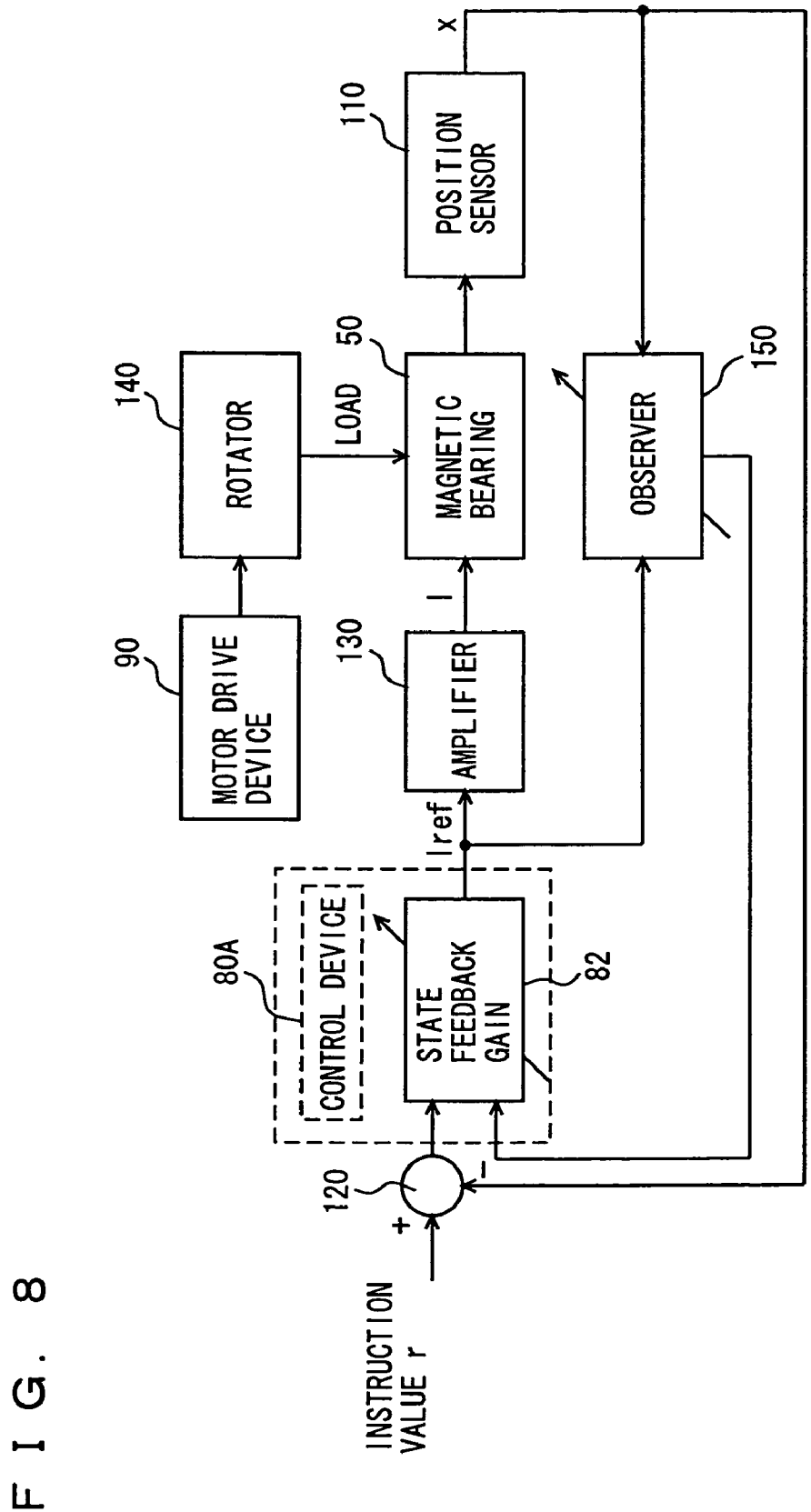
FIG. 8 is another block diagram of the magnetic bearing device according to the first embodiment.

The invention may provide a magnetic bearing device illustrated in a block diagram of FIG. 8. The block diagram of FIG. 8 differs from the block diagram of FIG. 5 only in that a control device 80A is employed instead of control device 80 in FIG. 5, and an observer 150 is added.

Referring to FIG. 8, observer 150 is formed based on a reference model in the state where magnetic bearing 50 receives no load. Observer 150 receives current instruction Iref issued from a state feedback gain 82 of control device 80A and position x issued from position sensor 110, and estimates a disturbance in the feedback control of magnetic bearing 50 based on received current instruction Iref and position x. Thus, observer 150 can estimate at least a speed and a stepwise disturbance.

Observer 150 changes the reference model based on the estimated disturbance, and estimates the state variables in the changed reference mode. For the following reasons, observer 150 changes the reference model as described above. If the change of the reference model in accordance with the disturbance were not performed, this would increase an estimation error in the state variables estimated by observer 150, and it would be impossible to perform the feedback control matching with the actual control model.

Observer 150 finally provides the estimated state variables to state feedback gain 82 of control device 80A.

Control device 80A includes state feedback gain 82. State feedback gain 82 adjusts the control gain to match with the gain corresponding to the state variables estimated by observer 150. Control device 80A performs the feedback control of magnetic bearing 50 with the adjusted control gain.

Structures and operations other than the above are the same as those already described.

As described above, even by the structure employing observer 150 and state feedback gain 82, it is possible to change the control model or the control gain in accordance with the magnitude of the load applied to magnetic bearing 50, and thereby to achieve the stable control of magnetic bearing 50.

Control device 80A adjusting the control gain operates in accordance with the flowchart of FIG. 7.

In practice, the adjustment of the control gain in each of control devices 80 and 80A is performed by a CPU (Central Processing Units), which reads a program including the respective steps in the flowchart of FIG. 7 from a ROM (Read Only Memory), executes the read program to estimate the magnitude of the load applied to magnetic bearing 50 in accordance with the flowchart of FIG. 7, and adjusts the control gain in accordance with the estimated magnitude of the load. Therefore, the ROM forms a computer-readable (CPU-readable) record medium, which stores the program including the respective steps in the flowchart of FIG. 7.

In step S10 illustrated in FIG. 7, the load may be estimated based on balance current I provided from amplifier 130 or the output of motor drive device 90 instead of current instruction Iref.

Further, in step S10 illustrated in FIG. 7, the load may be estimated by determining the magnitude of the frequency component on the low frequency side or the magnitude of the frequency component on the high frequency side in the open-loop transfer function of the feedback control of magnetic bearing 50. When the magnitude of the frequency component on the low frequency side or the magnitude of the frequency component on the high frequency side is determined, the Fourier transform calculation is performed based on the data having the data length, which satisfies the relationship that the data length is equal to a result of multiplication of the cycle at the target frequency by (integer/(control cycle)).

The operations in steps S20, S30 and S40 illustrated in FIG. 7 may be performed by the foregoing observer and state feedback gain.

Rotary shaft 40, magnetic bearing 50, motor 60 and control device 80 form the "magnetic bearing device".

Also, rotary shaft 40, magnetic bearing 50, motor 60, observer 150 and control device 80A form the "magnetic bearing device".

According to the first embodiment, the magnetic bearing device includes the control device, which estimates the magnitude of the load applied to the magnetic bearing, and adjusts the control parameters in the feedback control, which is effected on the magnetic bearing to float stably the rotary shaft, in accordance with the estimated magnitude of the load. Therefore, even when variations occur in magnitude of the load applied to the magnetic bearing, the magnetic bearing can be stably controlled.

[Second Embodiment]

Figure 9:
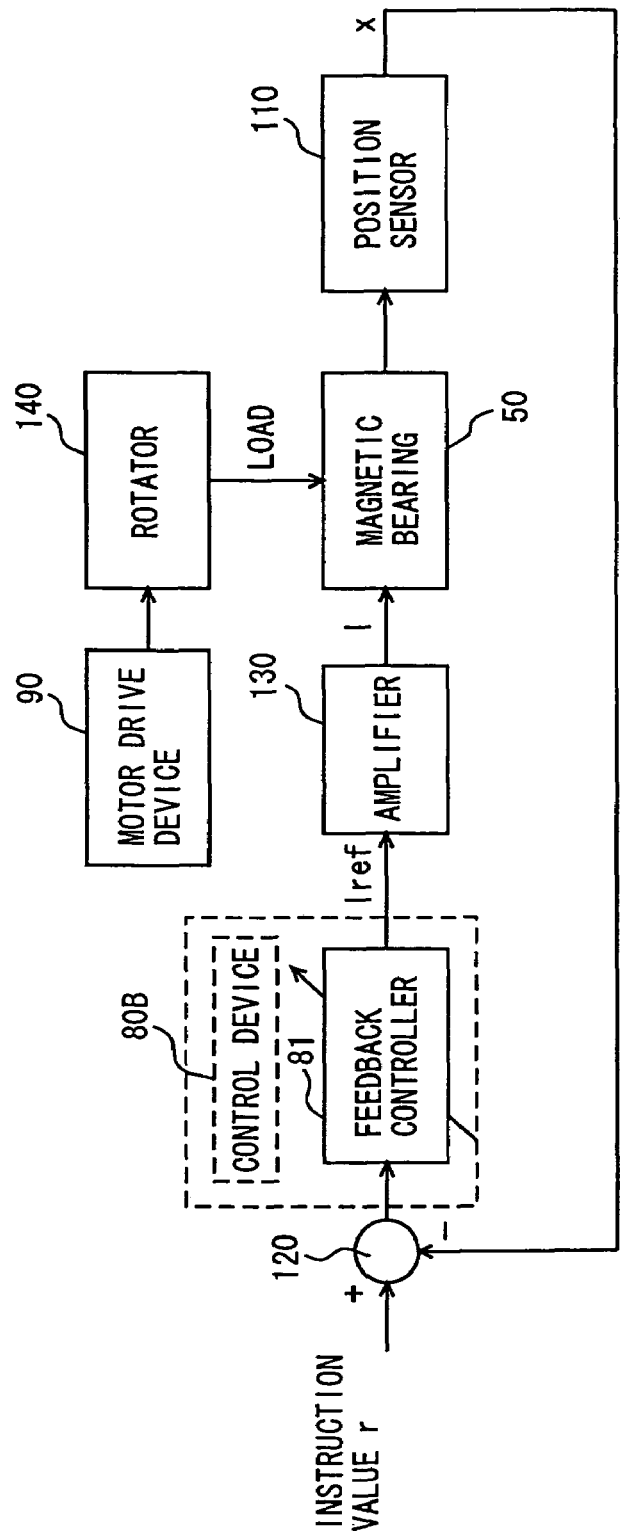
FIG. 9 is a block diagram of a magnetic bearing device according to a second embodiment.

FIG. 9 is a block diagram of a magnetic bearing device according to a second embodiment. The block diagram of FIG. 9 differs from the block diagram of FIG. 5 only in that control device 80 in FIG. 5 is replaced with control device 80B.

In addition to the functions of control device 80 already described, control device 80B has a function of determining a direction of the load applied to magnetic bearing 50, and controlling magnetic bearing 50 to move rotary shaft 40 in the direction opposite to the determined direction of the load.

Electromagnets 51–54 forming magnetic bearing 50 are arranged to form orthogonal coordinates as shown in FIGS. 2 and 3. From the currents flowing through respective electromagnets 51–54, it is therefore possible to determine the direction (i.e., the positive or negative direction) of the applied load on each coordinate axis, and the two directions thus determined can be combined to determine the direction of the load applied from fan 30 to magnetic bearing 50.

Referring to FIG. 3 again, description will now be given on the manner of determining the direction of the load. Electromagnets 51 and 52 form a pair, and electromagnets 53 and 54 form a pair. When the current flowing through electromagnet 52 is larger than that flowing through electromagnet 51, this represents that the load is applied positively in the direction of arrangement or alignment of electromagnets 51 and 52. When the current flowing through electromagnet 53 is larger than that flowing through electromagnet 54, this represents that the load is applied positively in the direction of arrangement or alignment of electromagnets 53 and 54.

By determining the difference in current between electromagnets 51 and 52 forming the electromagnet pair, it is possible to determine whether the load is applied positively or negatively in the direction of alignment of electromagnets 51 and 52. Also, by determining the difference in current between electromagnets 53 and 54 forming the electromagnet pair, it is possible to determine whether the load is applied positively or negatively in the direction of alignment of electromagnets 53 and 54.

The currents flowing through electromagnets 51–54 are equal to current instructions Iref1, Iref2, Iref3 and Iref4 to be supplied to electromagnets 51–54 by control device 80B, respectively. Therefore, control device 80B calculates the difference between current instructions Iref1 and Iref2 provided by control device 80B itself, and thereby determines whether the load is applied positively or negatively in the direction of the alignment of electromagnets 51 and 52. Also, control device 80B calculates the difference between current instructions Iref3 and Iref4 provided by control device 80B itself, and thereby determines whether the load is applied positively or negatively in the direction of the alignment of electromagnets 53 and 54. The difference between current instructions Iref1 and Iref2 and the difference between current instructions Iref3 and Iref4 are calculated from the current instructions processed with a low-pass filter.

Figure 10:
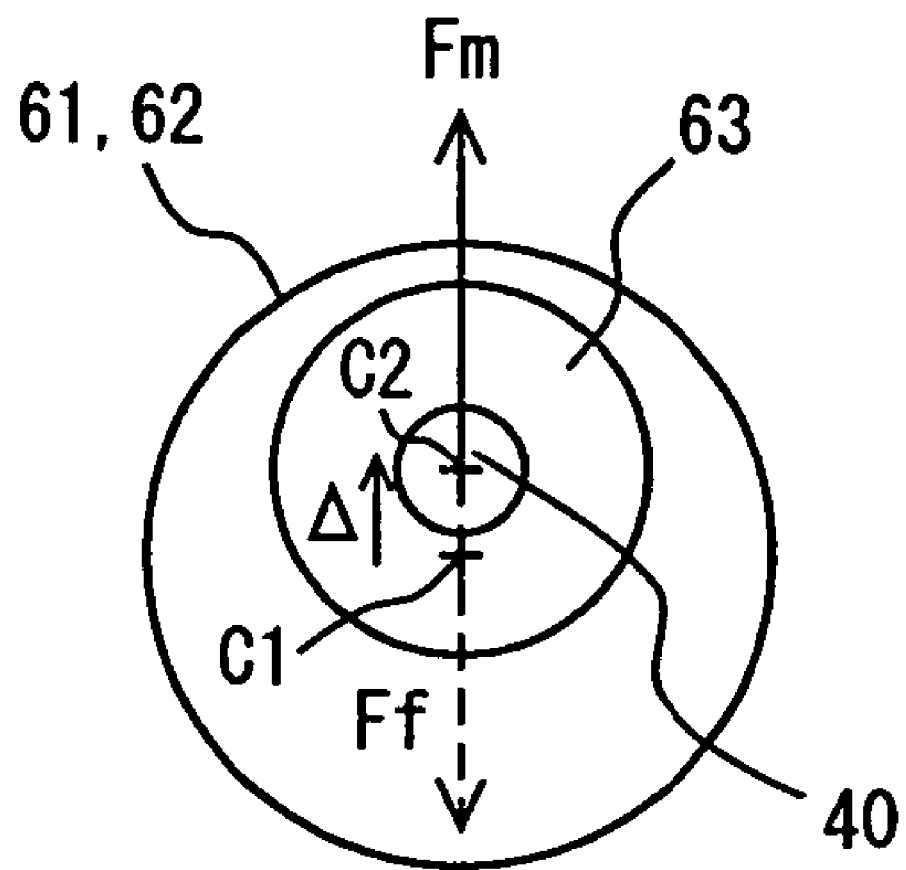
FIG. 10 is a cross section for illustrating a movement of a rotary shaft.

When control device 80B determines the direction (i.e., the positive or negative direction) of the load, it controls magnetic bearing 50 to move rotary shaft 40 in the direction opposite to the determined direction of the load. Referring to FIG. 10, when it is determined that fan 30 applies load Ff in the vertical direction, control device 80B controls magnetic bearing 50 to move the center of rotary shaft 40 from a point C1 to a point C2 by a distance Δ.

When the center of rotary shaft 40 moves distance Δ toward stators 61 and 62, stators 61 and 62 applies the attractive force expressed by the following formula (4):

$$Fm(\Delta) = q \frac{Bg^2}{X} \Delta \qquad (4)$$

Attractive force Fm is partially cancelled by load Ff applied from fan 30 so that the load applied to magnetic bearing 50 decreases. Thus, the change of control model is reduced.

Distance Δ of movement of rotary shaft 40 is in a range, which can prevent contact of rotor 63 with stators 61 and 62, and is generally equal to a quarter of a gap between stator 61 or 62 and rotor 63.

As described above, the second embodiment has the distinctive feature, in which the direction of the load applied to magnetic bearing 50 is determined, and rotary shaft 40 is moved in the direction opposite to the determined direction of the load so that attractive force Fm applied from stators 61 and 62 of motor 60 is partially cancelled by load Ff applied from fan 30 to reduce the load applied to magnetic bearing 50.

It is assumed that a current $I_O$ is supplied through electromagnets 51–54 when fan 30 stops, i.e., when fan 30 does not apply the load to magnetic bearing 50, and a current $I_L$ is supplied through electromagnets 51–54 when fan 30 is rotating. In this case, load Ff applied from fan 30 to magnetic bearing 50 is expressed by the following formula (5):

$$Ff = k \left( \frac{I_L - I_0}{xo + x} \right)^2 \qquad (5)$$

Accordingly, control device 80B may be configured to calculate load Ff applied from fan 30 based on the formula (5), and to determine distance Δ, by which the center of rotary shaft 40 is moved in the direction opposite to that of load Ff, in accordance with the magnitude of calculated load Ff. Thereby, if load Ff increases, distance Δ increases, and attractive force Fm(Δ) of motor 60 increases so that the magnitude, by which attractive force Fm(Δ) cancels load Ff, increases. Consequently, the change of the control model can be small even if load Ff changes.

After rotary shaft 40 is moved oppositely to the direction of load Ff, the control model is changed in accordance with the magnitude of load Ff in the first embodiment, and also the control parameters are changed based on the changed control model so that magnetic bearing 50 can be controlled stably.

Referring to FIG. 11, description will now be given on the operation of adjusting the control parameters by control device 80B. A flowchart of FIG. 11 differs from the flowchart of FIG. 7 only in that step S10 in FIG. 7 is replaced with steps S11–S13.

When the operation of adjusting the control parameters starts, control device 80B determines the direction of the load applied to magnetic bearing 50 based on current instructions Iref1, Iref2, Iref3 and Iref4 issued by control device 80B itself (step S11). Control device 80B controls magnetic bearing 50 to move rotary shaft 40 by distance Δ in the direction opposite to the determined direction of the load (step S12).

When rotary shaft 40 is moved oppositely to the direction of the load, control device 80B determines the magnitude of the load applied to magnetic bearing 50 based on current instruction Iref issued by control device 80B itself (step S13). Then, steps S20, S30, S40, S50 and S60 are executed, and the operation of adjusting the control parameters in the second embodiment ends.

The operations in steps S11 and S12 correspond to the control, which is effected on magnetic bearing 50 to reduce the change of the control model due to the determined load.

Control device 80B is merely required to execute at least steps S11–S13. Thus, control device 80B is merely required to determine the direction of the load applied to magnetic bearing 50, and to control magnetic bearing 50 to move rotary shaft 40 in the direction opposite to the determined direction of the load.

The adjustment of the control gain in control device 80B is actually performed by a CPU. The CPU reads a program including the respective steps of the flowchart illustrated in FIG. 11 from a ROM, executes the read program to determine the direction of the load applied to magnetic bearing 50 in accordance with the flowchart of FIG. 11, moves rotary shaft 40 in the direction opposite to the determined direction of the load, thereby reduces the change of the control model and adjusts the control gain in accordance with the magnitude of the load. Therefore, the ROM forms a computer-readable (CPU-readable) record medium, which stores the program including the respective steps in the flowchart of FIG. 11.

Rotary shaft 40, magnetic bearing 50, motor 60 and control device 80B form the "magnetic bearing device".

If the direction of the load is already known, rotary shaft 40 may be moved in the direction, which is predetermined.

According to the second embodiment, the magnetic bearing device includes the control device, which determines the direction of the load applied to the magnetic bearing, moves the rotary shaft oppositely to the direction of the determined load, and thereby controls the magnetic bearing to reduce the change of the control model. Therefore, the magnetic bearing can be stably controlled even when the magnitude of the load applied to the magnetic bearing varies. Further, an apparent performance of the magnetic bearing can be increased.

[Third Embodiment]

FIG. 12 is a block diagram of a magnetic bearing device according to a third embodiment. The block diagram of FIG. 12 differs from the block diagram of FIG. 5 only in that magnetic bearing 50 in FIG. 5 is replaced with a magnetic bearing 50A.

Magnetic bearing 50A is configured to receive equally the maximum load applied thereto.

Figure 13:
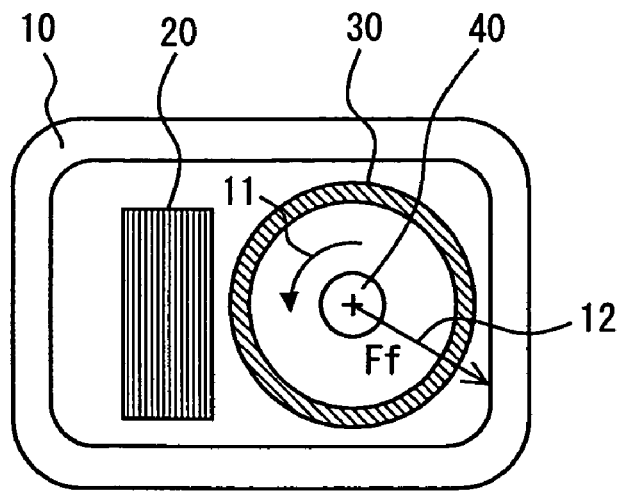
FIG. 13 is a cross section of a chamber shown in FIG. 1.

Referring to FIG. 13, when fan 30 arranged in chamber 10 rotates in a direction of an arrow 11, fan 30 applies load Ff to magnetic bearing 50 in a direction of an arrow 12. If fan 30 is a tangential fan, the direction of load Ff is hardly changed by the rotation speed of fan 30 or the gas pressure in chamber 10, and load Ff is substantially kept in a constant direction depending on, e.g., a form of chamber 10 or fan 30.

Accordingly, the positions of the four electromagnets are adjusted such that a resultant force of load Ff applied from fan 30 and gravitation mg may be applied equally in the direction of alignment of one of the electromagnet pair and the direction of alignment of the other electromagnet pair.

Figure 14:
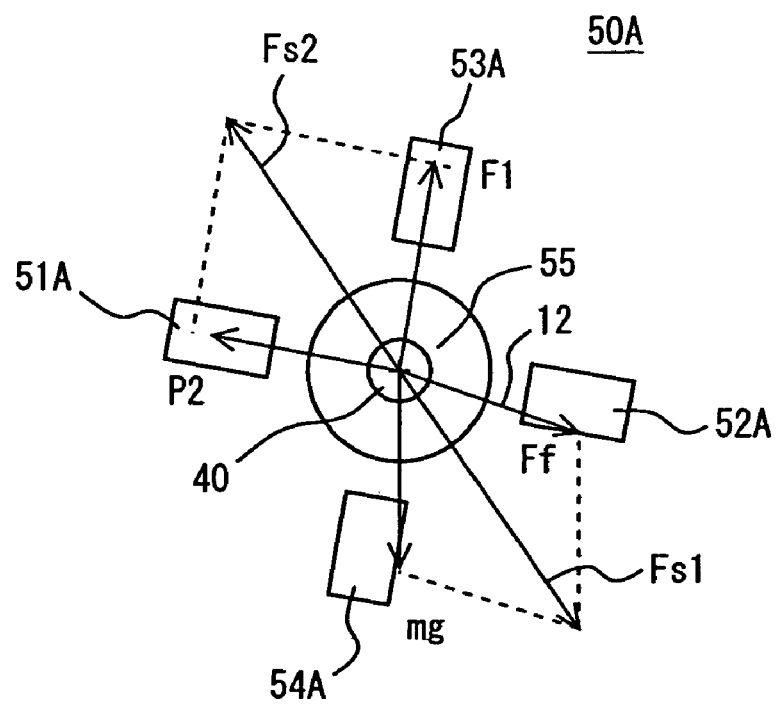
FIG. 14 illustrates a magnetic bearing illustrated in FIG. 12.

Referring to FIG. 14, magnetic bearing 50A is formed of electromagnets 51A–54A and target 55. Rotary shaft 40 receives gravitation mg in the vertical direction. Also, load Ff is applied in the direction indicated by arrow 12. Electromagnets 51A–54A are arranged such that a balance may be kept between a resultant force Fs1, which is formed of gravitation mg and load Ff, and a resultant force Fs2 formed of load F1, which is applied in the direction of alignment of electromagnets 53A and 54A, and load F2 applied in the direction of alignment of electromagnets 51A and 52A.

In this case, load Ff is the maximum load applied from fan 30 to magnetic bearing 50A. Therefore, resultant force Fs1 is the maximum force, and electromagnets 51A–54A are arranged to receive equally the maximum load applied to magnetic bearing 50A.

Figure 15:
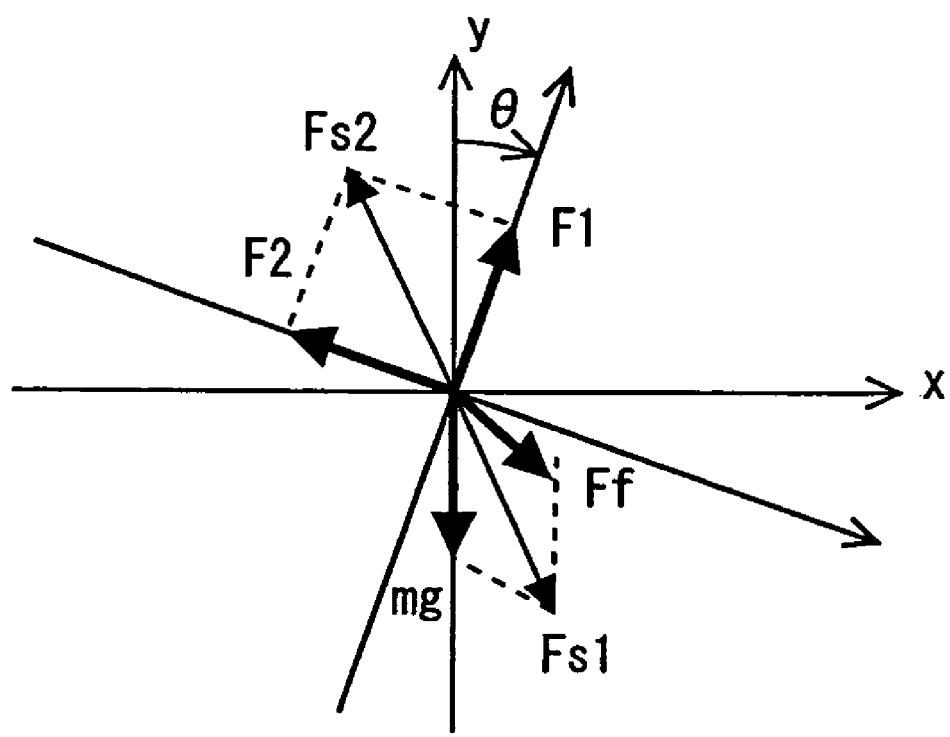
FIG. 15 illustrates arrangement of four electromagnets shown in FIG. 14.

In orthogonal coordinates illustrated in FIG. 15, it is assumed that gravitation mg is applied in the direction of the y-axis, and the x-axis is perpendicular to the y-axis. In this case, the direction of load F1, and thus the direction of alignment of electromagnets 53A and 54A forms an angle θ with respect to the y-axis. In this invention, angle θ is in a range from 0 to 45 degrees.

According to the distinctive feature of the third embodiment, as described above, electromagnets 51A–54A are arranged such that the two electromagnet pairs uniformly receive the maximum load, which is applied to magnetic bearing 50A. This can minimize the change of the control model of the magnetic bearing.

The following manner may be employed. After arranging electromagnets 51A–54A to receive equally the load, the magnitude of the load applied to magnetic bearing 50A is estimated in the manner according to the first embodiment, the control model of magnetic bearing 50A is changed in accordance with the estimated magnitude of the load, and the control parameters are adjusted based on the change of the control model.

According to the third embodiment, since the magnetic bearing device includes the magnetic bearing having the electromagnets, which equally receive the maximum load applied thereto, the change of the control model of the magnetic bearing can be minimum.

The second and third embodiments already described provide the structures and manners, which reduce the change of the control model of the magnetic bearing due to the load applied to the magnetic bearing. Therefore, any magnetic bearing device may be employed as the magnetic bearing device according to the invention provided that the magnetic bearing device includes a structure for reducing the change of the control model of the magnetic bearing, which may be caused by the load applied to the magnetic bearing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic bearing device comprising:
   a rotary shaft carrying a fan rotating at a variable speed in a chamber holding a variable gas pressure;
   a motor rotating said rotary shaft;
   a magnetic bearing holding said rotary shaft; and a control circuit changing a parameter in feedback control performed for holding said rotary shaft in a position allowing stable rotation of said fan, to a numeric value calculated based on a magnitude of a load applied to said magnetic bearing.

2. The magnetic bearing device according to claim 1, wherein said magnetic bearing includes an electromagnet for holding said rotary shaft in a predetermined position, and said control circuit detects the magnitude of said load based on a coil current flowing through a coil forming said electromagnet or a coil current instruction, and changes said parameter in accordance with the determined load.

3. The magnetic bearing device according to claim 2, wherein said control circuit determines an average of said coil current or said coil current instruction by processing said coil current or said coil current instruction with a low-pass filter, and determines the magnitude of said load based on the determined average, and a time constant of said low-pass filter is larger than a rotation cycle of said rotary shaft.

4. The magnetic bearing device according to claim 1, further comprising:

an observer capable of estimation of at least a speed and a magnitude of a stepwise load, wherein said control circuit includes a state feedback gain, said observer estimates a state variable by changing a reference model held by said observer itself in accordance with variations in said load, and said state feedback gain changes said gain based on the state variable estimated by said observer.

5. The magnetic bearing device according to claim 1, wherein said control circuit determines the magnitude of said load based on an output of a motor drive device driving said motor, and changes said parameter in accordance with the determined load.

6. The magnetic bearing device according to claim 1, wherein said control circuit determines the magnitude of said load by determining magnitudes of frequency components near a crossover frequency on an open-loop transfer function in said feedback control, increases a gain included in said parameter by a predetermined magnitude in response to increase in magnitude of the frequency component on a low frequency side of said determined frequency components, and decreases said gain by a predetermined magnitude in response to increase in magnitude of the frequency component on a high frequency side of said determined frequency components.

7. The magnetic bearing device according to claim 6, wherein said control circuit determines the magnitude of said frequency component by performing convolution calculation on only the target frequency component based on the Fourier transform theory.

8. The magnetic bearing device according to claim 7, wherein said control circuit performs said convolution calculation on said frequency component for each control cycle, and a data length of data subjected to said Fourier transform satisfies a relationship that the data length is equal to a result of multiplication of a cycle at a target frequency by (integer/(control cycle)).

9. The magnetic bearing device according to claim 1, wherein said control circuit further controls said magnetic bearing to reduce a change of a control model due to the magnitude of the load applied to said rotary shaft, and changes said parameter based on the control model reduced in change.

10. The magnetic bearing device according to claim 9, wherein said magnetic bearing includes a plurality of magnetic bearing pairs, said control circuit determines a direction of the load applied to said rotary shaft based on a plurality of currents flowing through said plurality of magnetic bearing pairs or a plurality of current instructions, and changes a floating position of said rotary shaft in a direction opposite to the determined direction of the load.

11. The magnetic bearing device according to claim 10, wherein said control circuit determines a plurality of forces corresponding to said plurality of magnetic bearing pairs and applied to the respective magnetic bearing pairs, and determines a direction of said load by combining the plurality of determined forces.

12. The magnetic bearing device according to claim 9, wherein said magnetic bearing includes a plurality of magnetic bearing pairs, and said plurality of magnetic bearing pairs are positioned to receive equally a resultant of a load caused by a gravitation of said rotary shaft and a maximum load applied by said fan.

13. A crossflow fan device for excimer laser comprising:

the magnetic bearing device according to any one of the preceding claims 1 to 12.

* * * * *